(12) United States Patent
Pern et al.

(10) Patent No.: US 10,634,534 B2
(45) Date of Patent: Apr. 28, 2020

(54) FLOW SENSING MODULE WITH BYPASS CHANNEL

(71) Applicant: Memsic Transducer Systems Co., Ltd., Wuxi, Jiangsu (CN)

(72) Inventors: Nan Jou Pern, Andover, MA (US); Ohlan Silpachai, Newbury Park, CA (US)

(73) Assignee: MEMSIC TRANSDUCER SYSTEMS CO., LTD., Wuxi, Jiangsu (CN)

( * ) Notice: Subject to any disclaimer, the term of this patent is extended or adjusted under 35 U.S.C. 154(b) by 161 days.

(21) Appl. No.: 15/687,435

(22) Filed: Aug. 25, 2017

(65) Prior Publication Data
US 2018/0066970 A1 Mar. 8, 2018

Related U.S. Application Data

(60) Provisional application No. 62/383,793, filed on Sep. 6, 2016.

(30) Foreign Application Priority Data

Apr. 10, 2017 (CN) .......................... 2017 1 0231216

(51) Int. Cl.
*G01F 1/684* (2006.01)
*G01F 5/00* (2006.01)
*G01F 1/692* (2006.01)

(52) U.S. Cl.
CPC ............ *G01F 1/684* (2013.01); *G01F 1/6842* (2013.01); *G01F 5/00* (2013.01); *G01F 1/692* (2013.01)

(58) Field of Classification Search
CPC .......... G01F 1/68; G01F 1/684; G01F 1/6845; G01F 1/6847
See application file for complete search history.

(56) References Cited

U.S. PATENT DOCUMENTS

| | | | | | |
|---|---|---|---|---|---|
| 5,750,892 | A | * | 5/1998 | Huang | ....................... G01F 1/40 73/202 |
| 2017/0342928 | A1 | * | 11/2017 | Ooga | ..................... G01F 1/6847 |

* cited by examiner

*Primary Examiner* — Justin N Olamit
(74) *Attorney, Agent, or Firm* — Han IP PLLC; Andy M. Han

(57) ABSTRACT

A flow sensing module with a bypass channel is provided. The flow sensing module may include a body portion and a flow sensor. The body portion may include a main fluid inlet, a main fluid outlet, a main fluid channel extending between the main fluid inlet and the main fluid outlet, a bypass fluid inlet and a bypass fluid outlet each configured to be in communication with the main fluid channel, and a bypass fluid channel extending between the bypass fluid inlet and the bypass fluid outlet. The flow sensor may be disposed in the bypass fluid channel to sense a flow rate of a fluid in the bypass channel. No pressure drop element is disposed in the main fluid channel, so the main fluid channel may have a pressure loss of a very small value. Moreover, linearity and sensitivity of the flow sensing module may also be improved.

7 Claims, 3 Drawing Sheets

FLOW SENSING MODULE WITH BYPASS CHANNEL

CROSS-REFERENCE TO RELATED APPLICATIONS

The present disclosure claims the priority benefit of U.S. Patent Application No. 62/383,793, filed on 6 Sep. 2016, as well as Chinese Patent Application No. 201710231216.2, filed on 10 Apr. 2017. The above-identified patent applications are hereby incorporated by reference in their entirety.

TECHNICAL FIELD

The present disclosure relates to flow sensors and, in particular, to a flow sensing module with a bypass channel.

BACKGROUND

A flow sensor is generally used for sensing a flow rate of a fluid (for example, gas or liquid) flowing through a fluid channel. Flow sensors are generally used in a wide range of applications, such as medical treatment, flight control, industrial processes, combustion control, weather monitoring, and many others. Due to different requirements from each of the applications, different types of flow sensors are needed for different applications. For instance, a flow sensor suitable for a breathing machine used in an intensive care unit (ICU) may be incapable of meeting requirements of a gas leakage detection system. A conventional flow meter, such as a hot wire anemometer, generally consumes much power. For a MEMS (Micro Electro Mechanical System) flow meter having a bypass channel, a pressure drop element, generally disposed between an inlet and an outlet of a bypass fluid channel within a main fluid channel, is typically employed to guide the fluid into the bypass fluid channel, thus causing a large pressure loss.

Therefore, it is necessary to provide a new flow sensor with improved pressure drop characteristics.

SUMMARY

One object of the present disclosure is to provide a flow sensing module with a bypass channel so as to achieve improved pressure drop characteristics.

According to one aspect of the present disclosure, a flow sensing module is provided. The flow sensing module may include a body portion and a flow sensor. The body portion may include the following: a main fluid inlet, a main fluid outlet, a main fluid channel extending between the main fluid inlet and the main fluid outlet, a bypass fluid inlet configured to be in communication with the main fluid channel and located at a second position which is upstream with respect to a location of the main fluid outlet, a bypass fluid outlet configured to be in communication with the main fluid channel and located at a first position which is downstream with respect to a location of the main fluid inlet, wherein the first position is upstream with respect to the second position, and a bypass fluid channel extending between the bypass fluid inlet and the bypass fluid outlet. The flow sensor may be disposed in the bypass fluid channel to sense a flow rate of a fluid in the bypass channel and obtain a measured value thereof, wherein the flow rate of the fluid in the bypass channel is related to a flow rate of a fluid in the main fluid channel.

In a preferred embodiment, a cross-sectional area of the main fluid inlet is smaller than a cross-sectional area of the main fluid channel.

In a preferred embodiment, the flow sensor is a MEMS thermal flow sensor.

In a preferred embodiment, a flow direction of the fluid in the bypass fluid channel is opposite to a flow direction of the fluid in the main fluid channel.

In a preferred embodiment, the main fluid channel is hollow, and no pressure drop element is disposed in the main fluid channel.

Compared with existing flow sensing modules, the flow sensing module according to the present disclosure does not include a pressure drop element disposed in the main fluid channel. Consequently, the main fluid channel may have a very small pressure loss. Moreover, linearity and sensitivity of the flow sensing module may be improved.

DETAILED DESCRIPTION OF THE EMBODIMENTS

The present disclosure is further explained and described below with reference to the accompany drawings.

The present disclosure provides a flow sensing module wherein no pressure drop element is disposed in a main fluid channel of the flow sensing module. Consequently, the main fluid channel may exhibit very little pressure loss (i.e., a pressure loss of a small value), and linearity and sensitivity of the flow sensing module may also be enhanced.

Figure 1:
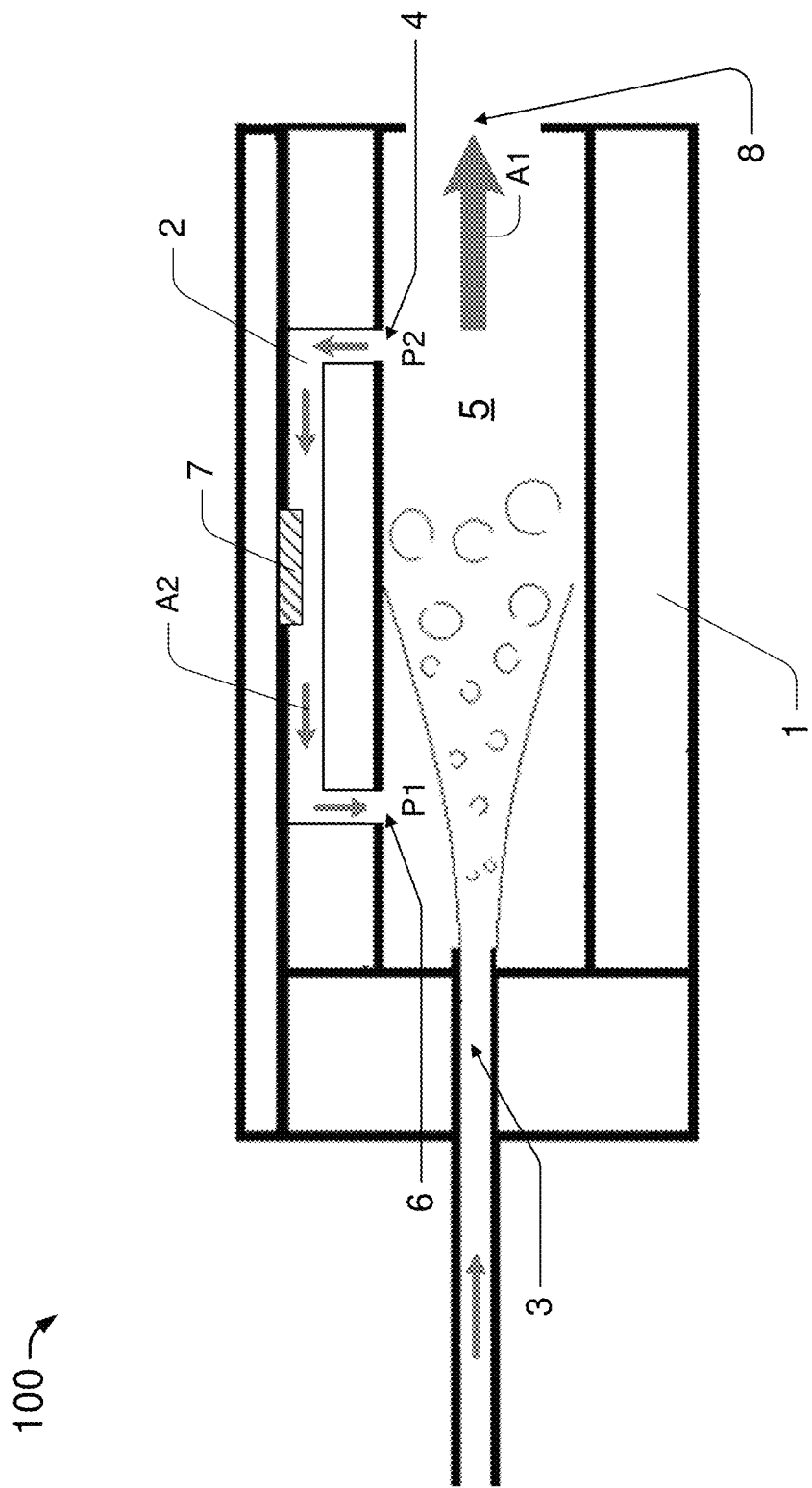
FIG. 1 is a schematic structural diagram of a flow sensing module according to one embodiment of the present disclosure.

FIG. 1 is a schematic structural diagram of a flow sensing module 100 according to an embodiment of the present disclosure. The flow sensing module 100 includes a body portion 1.

The body portion 1 includes a main fluid inlet 3, a main fluid outlet 8, a main fluid channel 5 extending between the main fluid inlet 3 and the main fluid outlet 8, a bypass fluid inlet 4 that is in communication with the main fluid channel 5 and located at a second position P2 which is upstream with respect to a location of the main fluid outlet 8, a bypass fluid outlet 6 that is in communication with the main fluid channel 5 and located at a first position P1 which is downstream with respect to a location of the main fluid inlet 3, and a bypass fluid channel 2 extending between the bypass fluid inlet 4 and the bypass fluid outlet 6, wherein the first position P1 is located at an upstream location with respect to the second position P2. Whether a location of FIG. 1 is upstream or downstream with respect to another location of FIG. 1 is based on a flow direction of a fluid within the main fluid channel 5, as indicated by arrow A1 of FIG. 1. The main fluid channel 5 is hollow, and no pressure drop element is disposed in the main fluid channel 5. A cross-sectional area of the main fluid inlet 3 is smaller than a cross-sectional area of the main fluid channel 5. A cross-sectional area of either the main fluid inlet 3 or the main fluid channel 5 may be defined on a plane substantially perpendicular to a longitudinal direction of the main fluid inlet 3 or the main fluid channel 5, respectively. The flow sensing module 100 further may include a flow sensor 7 disposed in the bypass fluid channel 2.

As mentioned above, the main fluid channel 5 has a larger cross section than the main fluid inlet 3 does. Therefore, a fluid entering the main fluid channel 5 via the main fluid inlet 3 may, due to momentum, cause a greater pressure at the second position P2 as compared to the first position P1. The pressure difference between the second position P2 and the first position P1 may thus drive at least part of the fluid to enter the bypass fluid channel 2 via the bypass fluid inlet 4 located at the downstream position P2. The part of the fluid that enters the bypass fluid inlet 4 may then again enter the main fluid channel 5 via the bypass fluid outlet 6. A flow direction of the fluid in the bypass fluid channel 2, indicated by the arrow A2 of FIG. 1, may be opposite to the flow direction A1 of the fluid in the main fluid channel 5. The flow sensor 7 may be used to sense a flow rate of the fluid in the bypass channel 2 and obtain a measured value thereof. The measured flow rate of the fluid in the bypass fluid channel 2 may be related to a flow rate of the fluid in the main fluid channel 5. That is, the flow rate of the fluid flowing in the bypass fluid channel 2 may be a function of the flow rate of the fluid flowing in the main fluid channel 5, or vice versa. Therefore, the flow rate of the main fluid channel 5 may be obtained through the function based on the measured value of the flow rate of the fluid in the bypass fluid channel 2 that is obtained by the flow sensor 7. The flow sensor 7 may be a MEMS thermal flow sensor.

Figure 2:
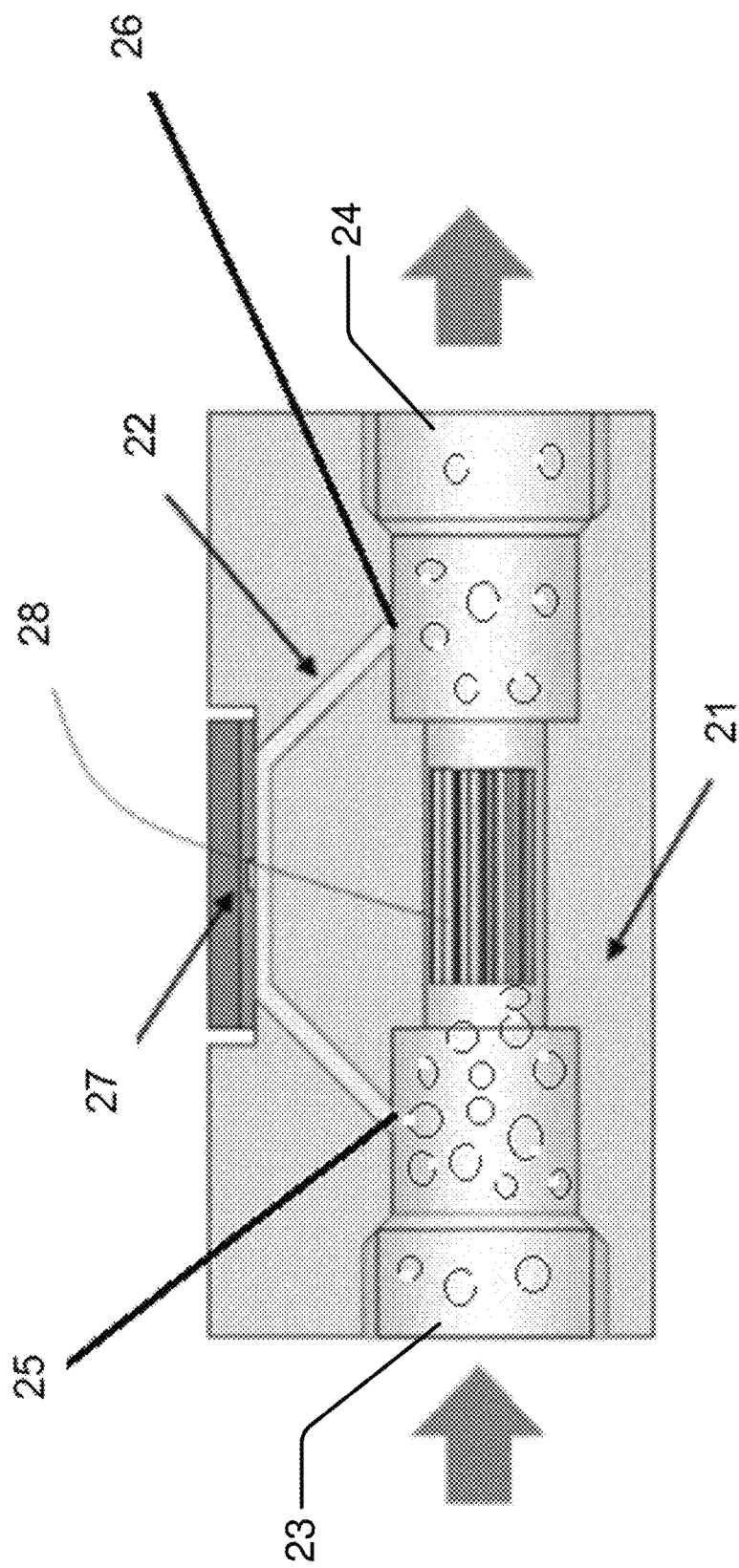
FIG. 2 is a schematic structural diagram of a conventional flow sensing module.

FIG. 2 is a schematic structural diagram of a conventional flow sensing module. As shown in FIG. 2, the flow sensing module also includes a body portion 21 and a flow sensor 27.

The body portion 21 includes a main fluid inlet 23, a main fluid outlet 24, a main fluid channel extending between the main fluid inlet 23 and the main fluid outlet 24, a bypass fluid inlet 25 that is in communication with the main fluid channel and located at a downstream location with respect to a location of the main fluid inlet 23, a bypass fluid outlet 26 that is in communication with the main fluid channel and located at an upstream location with respect to the main fluid outlet 24, and a bypass fluid channel 22 extending between the bypass fluid inlet 25 and the bypass fluid outlet 26, wherein the bypass fluid inlet 25 is located at an upstream location with respect to a location of the bypass fluid outlet 26. A pressure drop element 28 is disposed in the main fluid channel. The flow sensor 27 is disposed in the bypass fluid channel, and is configured to sense a flow rate of a fluid in the bypass channel 22 to obtain a measured value, wherein the flow rate of the fluid in the bypass fluid channel 22 is related to a flow rate of a fluid in the main fluid channel. That is, the flow rate of the fluid flowing in the bypass fluid channel may be a function of the flow rate of the fluid flowing in the main fluid channel, or vice versa. Therefore, the flow rate of the main fluid channel may be obtained based on the measured value obtained by the flow sensor 27.

Figure 3:
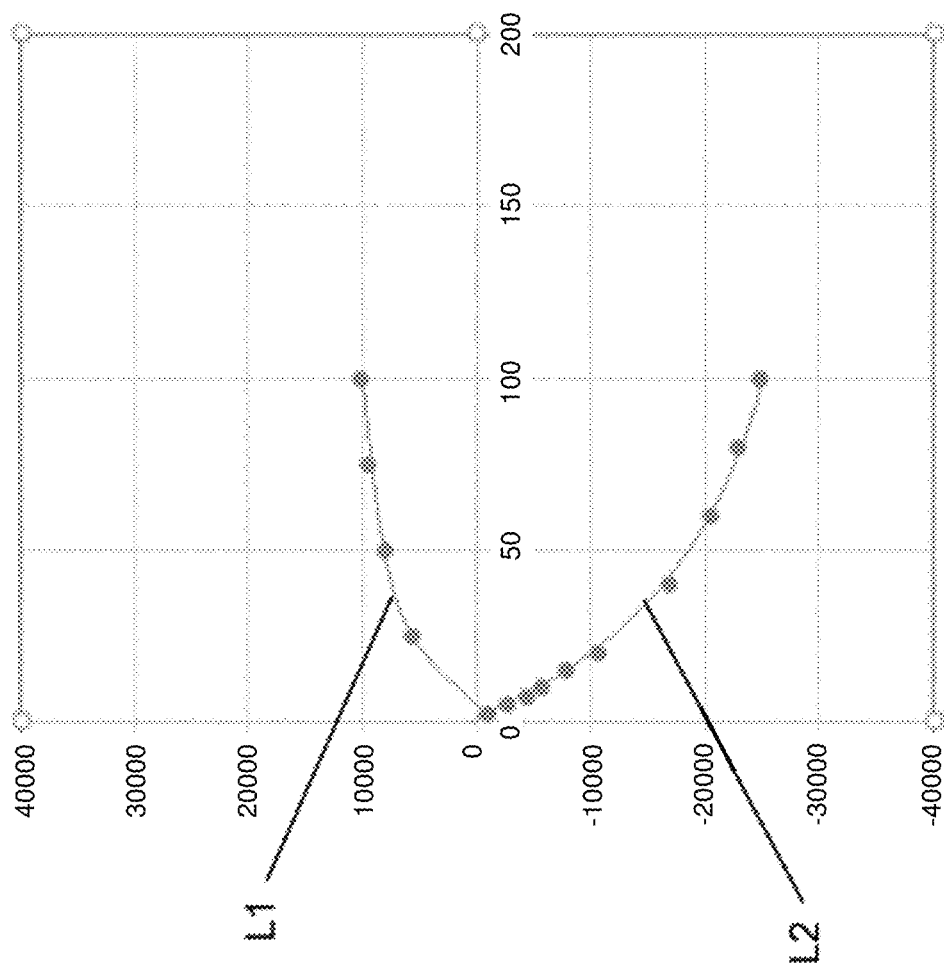
FIG. 3 shows experimental data curves of the flow sensing module in FIG. 1 and the flow sensing module in FIG. 2.

FIG. 3 shows experiment data curves, L2 and L1, of the flow sensing module 100 of FIG. 1 and the flow sensing module of FIG. 2, respectively. In particular, L2 is an experiment data curve of the flow sensing module 100 of FIG. 1, whereas L1 is an experiment data curve of the flow sensing module of FIG. 2. The horizontal coordinate of FIG. 3 represents a flow rate of the fluid entering the main fluid channel via the main fluid inlet 3 or 23, and the vertical coordinate of FIG. 3 represents a sensed signal obtained by the flow sensor 7 or 27. As shown in FIG. 3, a linearity of curve L2 is obviously better (i.e., more linear) than that of curve L1. In addition, when the flow rate of the fluid at the main fluid inlet is 100, curve L2 has not saturated, but curve L1 has substantially saturated. Moreover, the flow sensor 7 of FIG. 1 is obviously more sensitive than the flow sensor 27 of FIG. 2, having a better linearity and a larger dynamic range of measurement. For example, when the flow rate of the fluid at the main fluid inlet is 50 SLM (Standard Liter per Minute), the value of a sensed signal of curve L1 is about 8000 LSB (least significant bit), and the value of a sensed signal of curve L2 is about 18000 LSB. It should be noted that, because the flow direction of the fluid in the bypass fluid channel 2 of the flow sensing module 100 of FIG. 1 is opposite to the flow direction of the fluid in the main fluid channel 5 thereof, curve L2 is shown in FIG. 3 as having negative values.

As disclosed above, since there is no pressure drop element disposed in the main fluid channel 5 of the flow sensing module 100, the main fluid channel 5 may have a very small pressure loss, and improvement in both linearity and sensitivity of the flow sensing module 100 can be achieved, which in turn improves the dynamic range of measurement. The flow sensing module 100 of the present disclosure may be utilized in applications which require a smaller pressure loss.

In addition, it is not uncommon that impurities may present in fluid. As fluid having impurities flows through a conventional flow sensing module having a pressure drop element (such as the pressure drop element 28 of the flow sensing module of FIG. 2), especially for a prolonged period of time, the impurities may gradually accumulate in the bypass fluid channel (such as the bypass fluid channel 22). Over time, application and measurement precision may be gradually affected to an extent that the fluid sensing module may fail to function. On the contrary, the impurities in the fluid may not cause a problem to the flow sensing module 100 of the present disclosure. That is, in lack of a pressure drop element disposed in the main fluid channel 5, most of the impurities in the fluid would directly flow out of the flow sensing module 100 via the main fluid outlet 8 due to inertia. Only very few impurities might flow to the bypass fluid channel 2 via the bypass fluid inlet 4. Therefore, the quantity of the impurities accumulated in the bypass fluid channel 2 is significantly reduced. Accordingly, an antifouling property of the flow sensing module 100 is enhanced.

It should be noted that any modification made by a person skilled in the art to the specific implementation manners of the present disclosure shall not depart from the scope of the claims of the present disclosure. Accordingly, the scope of the claims of the present disclosure is not limited to the foregoing specific implementation manners.

What is claimed is:

1. A flow sensing module, comprising:
   a body portion, comprising:
   a main fluid inlet;
   a main fluid outlet;
   a main fluid channel extending between the main fluid inlet and the main fluid outlet and configured to accommodate a main fluid having a main flow direction directing from the main fluid inlet towards the main fluid outlet;
   a bypass fluid inlet configured to be in communication with the main fluid channel at a second position of the main fluid channel;
   a bypass fluid outlet configured to be in communication with the main fluid channel at a first position of the main fluid channel, the first position being at an upstream location with respect to the second position in view of the main flow direction;

a bypass fluid channel extending between the bypass fluid inlet and the bypass fluid outlet and configured to accommodate a bypass fluid having a bypass flow direction directing from the bypass fluid inlet towards the bypass fluid outlet; and a flow sensor disposed in the bypass fluid channel, wherein:

the second position is at an upstream location with respect to the main fluid outlet in view of the main flow direction, the first position is at a downstream location with respect to the main fluid inlet in view of the main flow direction, the bypass fluid is diverted from the main fluid at the second position and merged back to the main fluid at the first position, and the flow sensor is configured to obtain a measured value of a flow rate of the bypass fluid for anticipating a flow rate of the main fluid.

2. The flow sensing module according to claim 1, wherein a cross-sectional area of the main fluid inlet is smaller than a cross-sectional area of the main fluid channel.

3. The flow sensing module according to claim 2, wherein the flow sensor is a micro-electrical-mechanical-system (MEMS) thermal flow sensor.

4. The flow sensing module according to claim 1, wherein the bypass flow direction is substantially opposite to the main flow direction.

5. The flow sensing module according to claim 1, wherein the main fluid channel is hollow, and no pressure drop element is disposed in the main fluid channel.

6. The flow sensing module according to claim 1, wherein the main fluid channel is substantially straight, and wherein the main flow direction does not comprise a turn.

7. The flow sensing module according to claim 6, wherein the bypass fluid channel includes a straight section that is in parallel with the main fluid channel, and wherein the flow sensor is disposed in the straight section of the bypass fluid channel.

* * * * *